(12) United States Patent
Agarwal et al.

(10) Patent No.: US 11,363,140 B2
(45) Date of Patent: Jun. 14, 2022

(54) SYSTEMS AND METHODS FOR OPERATING AN INTERACTIVE VOICE RESPONSE SYSTEM

(71) Applicant: Celligence International LLC, Guaynabo, PR (US)

(72) Inventors: Pavan Agarwal, Arcadia, CA (US); Gabriel Albors Sanchez, Arcadia, CA (US); Jonathan Ortiz Rivera, Arcadia, CA (US)

(73) Assignee: Celligence International LLC, Guaynabo, PR (US)

( * ) Notice: Subject to any disclaimer, the term of this patent is extended or adjusted under 35 U.S.C. 154(b) by 0 days.

(21) Appl. No.: 16/814,322

(22) Filed: Mar. 10, 2020

(65) Prior Publication Data

US 2021/0281682 A1    Sep. 9, 2021

Related U.S. Application Data

(63) Continuation of application No. 16/812,245, filed on Mar. 6, 2020.

(51) Int. Cl.
*H04M 3/493* (2006.01)
*H04M 3/51* (2006.01)
(Continued)

(52) U.S. Cl.
CPC .......... *H04M 3/4936* (2013.01); *G06F 3/017* (2013.01); *G06F 3/167* (2013.01); *G06N 20/00* (2019.01);
(Continued)

(58) Field of Classification Search
CPC ......... G06F 3/017; G06F 3/167; G06N 20/00; G10L 15/18; G10L 15/22;
(Continued)

(56) References Cited

U.S. PATENT DOCUMENTS

| 9,001,819 B1* | 4/2015 | Or-Bach | H04L 65/4015 |
| | | | 370/352 |
| 2003/0162561 A1* | 8/2003 | Johnson | G06F 9/451 |
| | | | 455/553.1 |

(Continued)

OTHER PUBLICATIONS

International Search Report and Written Opinion in PCT/US21/17294, dated Mar. 26, 2021.

*Primary Examiner* — Hemant S Patel
(74) *Attorney, Agent, or Firm* — Sheppard Mullin Richter & Hampton LLP

(57) ABSTRACT

Systems and methods are provided for initiating an Intelligent Virtual Assistant (IVA) for facilitating user interaction with the automated call handling system such as Interactive Voice Response (IVR) system. A computer-implemented method may obtain a command for initiating an IVA system during a call between a mobile device operated by a user and an automated call handling system. Next, the method may obtain a first natural language command from the mobile device, determine a first user action based on the first natural language command, and transmit the determined user action to the automated call handling system. Finally, the method may obtain a first audio response from the automated call handling system in response to the transmitted user action, and transmit the first audio response to the user upon determining that the first audio response includes information associated with the first user request.

17 Claims, 7 Drawing Sheets

(51) Int. Cl.
*G06N 20/00* (2019.01)
*G06F 3/01* (2006.01)
*H04L 67/02* (2022.01)
*G06F 3/16* (2006.01)
*G10L 15/18* (2013.01)
*G10L 15/22* (2006.01)
*H04M 3/523* (2006.01)

(52) U.S. Cl.
CPC .............. *G10L 15/18* (2013.01); *G10L 15/22* (2013.01); *H04L 67/02* (2013.01); *H04M 3/5166* (2013.01); *H04M 3/5191* (2013.01); *H04M 3/5232* (2013.01); *G10L 2015/223* (2013.01); *H04M 2201/40* (2013.01); *H04M 2201/42* (2013.01); *H04M 2203/252* (2013.01); *H04M 2203/551* (2013.01)

(58) Field of Classification Search
CPC .............. G10L 2015/223; H04L 67/02; H04M 3/4936; H04M 3/5166; H04M 3/5191; H04M 3/5232; H04M 2201/40; H04M 2201/42; H04M 2203/252; H04M 2203/551
USPC ........ 370/351–357; 379/67.1–88.28, 201.01; 709/201–207, 217–248; 704/270–278
See application file for complete search history.

(56) References Cited

U.S. PATENT DOCUMENTS

| | | |
|---|---|---|
| 2004/0240640 A1* | 12/2004 | Warner .............. H04M 3/5166 379/88.18 |
| 2005/0207545 A1 | 9/2005 | Gao |
| 2011/0110364 A1 | 5/2011 | Fried |
| 2011/0211679 A1 | 9/2011 | Mezhibovsky |
| 2013/0108030 A1* | 5/2013 | Snir .................... H04M 3/4936 379/88.01 |
| 2016/0028889 A1* | 1/2016 | Mittal .................. H04M 3/493 379/265.09 |
| 2018/0255180 A1* | 9/2018 | Goldberg .............. H04L 51/02 |

* cited by examiner

SYSTEMS AND METHODS FOR OPERATING AN INTERACTIVE VOICE RESPONSE SYSTEM

RELATED APPLICATIONS

This application is a continuation of U.S. patent application Ser. No. 16/812,245, filed on Mar. 6, 2020, the contents of which are incorporated herein by reference in its entirety.

TECHNICAL FIELD

The present disclosure is generally related to controlling and operating an automated call handling system. More particularly, the present disclosure is directed to systems and methods for initiating an intelligent virtual assistant in order to facilitate a user's interaction with the automated call handling system.

BACKGROUND

An automated call handling system, such as Interactive voice response (IVR) system, is an automated system designed to interact with callers by gathering required information and routing the calls to a particular recipient without the help of a human assistant. To reach the IVR system, callers must dial a telephone number provided by a business they are trying to reach and then get connected to an IVR system that plays pre-recorded voice menus to the callers. By navigating through the pre-recorded voice menus, callers can obtain specific information and services.

Interacting with the IVR system may be time consuming and complicated. A user attempting to reach a customer service representative to resolve a question or concern may be required to identify an appropriate telephone number to call, navigate and remember a number of options, ongoing prompts for information, and wait on hold until a live agent is available to answer the user's call. If the user is disconnected or unable to wait for a live agent, the user may need to repeat the process multiple times to speak to a live agent. The process of phone communication through selecting menu options may be wasteful of the user's time, as the user must wait for the options to be spoken.

Accordingly, a user may be forced to underutilize the capabilities of the IVR system, or worse, end up with an unsatisfactory result. There is an ongoing need for improved systems and methods to allow users to interact with the IVR system.

SUMMARY

In accordance with one or more embodiments, various features and functionality can be provided to enable or otherwise facilitate the use of an intelligent virtual assistant when interacting with an IVR system.

Embodiments of the disclosure are directed to methods for operating an interactive voice response (IVR) system. In one embodiment, the method may include obtaining a command for initiating an intelligent voice assistant (IVA) system during a call between a mobile device operated by a user and an automated call handling system.

The initiating command may include a haptic input effectuated on the mobile device. In some embodiments, the haptic input of the initiating command for initiating the IVA system may include a tap pattern.

The IVA system may be configured to receive user input comprising natural language commands for operating the automated call handling system. The method may also include obtaining a first natural language command from the mobile device microphone. The method may further include determining a first user action based on the first natural language command. The first user action may specify a first user request. The method may also include transmitting the determined user action to the automated call handling system. The method may further include obtaining a first audio response from the automated call handling system in response to the transmitted user action. The method may further include transmitting the first audio response to the user upon determining that the first audio response includes information associated with the first user request.

In some embodiments, the call to the automated call handling system may be initiated via a telephony network. In some embodiments, the automated call handling system may be associated with an IVR system comprising a plurality of IVR prompts.

In some embodiments, the method may further include navigating the IVR system including transmitting a response from the telephony service to the automated call handling system in response to the IVR prompt.

In another embodiment, the method may further include obtaining prompt information associated with the automated call handling system, the prompt information including at least one of a known sequence of IVR prompts, and a predetermined IVR response. The method may further include obtaining historic user information associated the automated call handling system, the historic information including IVR prompts previously selected by the user.

In some embodiments, determining the first user action may include using a machine learning algorithm on the first natural language command, the prompt information, and the historic user information.

In some embodiments, determining the first user action may include identifying an IVR prompt associated with the first user request based on the output of the machine learning algorithm. In some embodiments, determining that the first audio response includes information associated with the first user request may include using natural language processing.

In some embodiments, transmitting the determined user action to the automated call handling system may include identifying an IVR prompt associated with the first user request. In some embodiments, transmitting the determined user action may include transmitting an audio transmission to the IVR system using an XMPP protocol.

DETAILED DESCRIPTION

Figure 1:
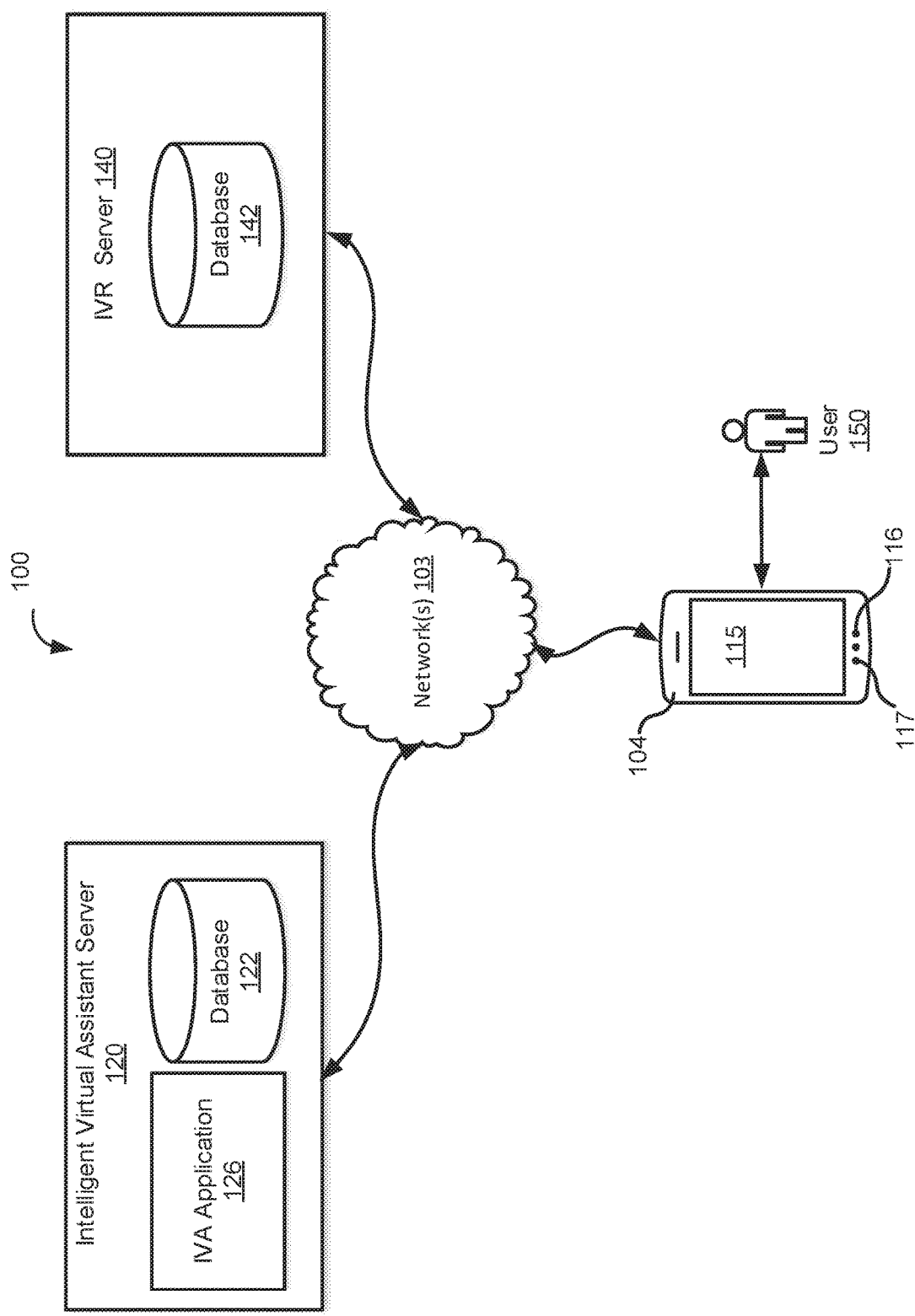
FIG. 1 illustrates example systems and a network environment, according to an implementation of the disclosure.

Described herein are systems and methods for using voice commands to initiate an intelligent personal assistant configured to control the operation of an IVR system. The details of some example embodiments of the systems and methods of the present disclosure are set forth in the description below. Other features, objects, and advantages of the disclosure will be apparent to one of skill in the art upon examination of the following description, drawings, examples, and claims. It is intended that all such additional systems, methods, features, and advantages be included within this description, be within the scope of the present disclosure, and be protected by the accompanying claims.

As alluded to above, contacting a business via a telephone remains one of the most frequent ways to interact with a business. Often, when contacting a business via a telephone, users communicate with an automated call handling system. For example, call handling systems used by businesses may include IVR, automated attendant, voice response unit (VRU), automatic call distributor (ACD), or other computer telephony integration (CTI) or computer-supported telecommunications applications (CSTA).

Typically, an IVR system serves the same function as one or multiple human receptionists or phone operators. For example, use of an IVR system enables users initiating communication with the business or receiving communication from the business to direct and categorize their own communications, guided by a series of automated requests for information. For example, an IVR system may audibly instruct a user to press a certain dual tone multi-frequency (DTMF, or "touch tone") button on a telephone or speak a verbal command (e.g., into the microphone of a telephone) to indicate a preferred spoken language for the duration of the communication. The IVR system may also present a series of numbered menus (e.g., delivered by a synthesized or recorded voice) to which a user may respond using dual tone multi-frequency (DTMF, or "touch tone") buttons or signals, verbal responses, or another means of input such as text, data generated via a Voiceover-Internet-Protocol (VoIP) connection, and so forth.

Through the use of the IVR systems, communications may be categorized, evaluated, and directed to appropriate departments or individuals within a business in the absence of human interaction. Typically, a larger volume of communications may be undertaken in a more efficient and streamlined manner through the use of an IVR system than what would be possible using conventional person-to-person communications.

However, users attempting to reach a live agent or resolve a question or concern using the IVR system are required to navigate a series of verbally-presented menus or to provide requested information responsive to audio prompts, using voice commands, DTMF buttons, or similar audible responses. This experience is often tedious and cumbersome.

An intelligent virtual assistant (IVA) can accept spoken human natural language commands as input from a client computing device (e.g., a smartphone), and perform tasks for the user using the device. For example, a user can communicate with an IVA through an intelligent voice interface by speaking natural language commands and ask specific questions (e.g., current weather conditions, hours of operation of a store, etc.)

Because the most comfortable way for humans to solve problems is through a conversation, users may want to interact with the IVR system through an IVA configured to operate the IVR system. By allowing users to interact with the IVR system though natural language commands exchanged with the IVA, results in a more user-friendly interaction and produces a more satisfactory user experience. Furthermore, by using a distinguishable voice command (e.g., saying "knock-knock") to initiate control and/or trigger the IVA used to control the IVR system, as explained above, allows users to invoke the IVA functionality on an as needed basis. Finally, when the IVA is initiated after the user has been interacting with the IVR system, the IVA can obtain the data entered previously by the user to help in the control of the IVR system, thereby reducing the time the user spends with the IVR system.

In accordance with various embodiments, a user may initiate a communication over a telephone network connection to a numbered communication address using a client computing device (e.g., place a call to a telephone number) to reach an IVR system. Upon connecting to the IVR system, the user can initiate an communication tool. For example, a user can double knock on a screen or a housing of a communication device such as a smartphone to initiate a communication tool during a telephone call. Alternatively, the user can use a spoken natural language command (e.g., "Open Knock-Knock Assistant").

In some embodiments, the communication tool may be an intelligent virtual assistant (IVA) configured to allow users to control and/or interact with functionalities of the IVR system using spoken natural language commands. In some embodiments, the communication tool may include a GUI interface configured to present visual data. For example, the visual data may include visual representation of the IVR menus and/or prompts, including indicating the menu item or prompt the user is currently responding to, and data obtained in response to user inquiry. In some embodiments, the GUI interface of the communication tool may be configured to obtain user input entered as natural language text commands.

Because the communication tool may be configured to control a user's interaction with the IVR system, the user can interact with a particular IVR system using spoken or textual commands in a natural language without having to learn and/or navigate the menus of the IVR system, as alluded to earlier.

Finally, in some embodiments, the communication tool may gather, collect, and analyze user data including past user interactions with the IVR system. By virtue of tracking user data, the communication tool may provide user with additional functionality, as described in further detail below.

Before describing the technology in detail, it is useful to describe an example network environment in which the presently disclosed technology can be implemented. FIG. 1 illustrates one such example environment 100.

FIG. 1 illustrates an example systems and a network environment 100 which permits users to initiate a communication tool comprising an intelligent virtual assistant (IVA) for operating an IVR system and a corresponding GUI in accordance with various embodiments described herein. In some embodiments, environment 100 may include a client computing device 104, an intelligent virtual assistant server 120, an IVR server 140, and a network 103. A user 150 may be associated with client computing device 104 as described in detail below.

In some embodiments, client computing device 104 may be configured for wired and/or wireless communications over network 103. In some embodiments, network 103 may include telephony network connections and wireless data connections, over which client computing device 104 may be configured to communicate. For example, the telephony network may be one or a combination of mobile networks such as a global system for mobile communications (GSM) network or code division multiple access (CDMA) network, or a landline network such as the public switched telephone network (PSTN). In some embodiments, the telephony network may also carry VoIP communications.

In some embodiments, the various below-described components of FIG. 1 may be used to detect and process commands user 150 enters via communication device 104 to initiate one or more events within client computing device 104 during a communication session between client communication device 104 and IVR server 140 over a telephony network connection (e.g., PSTN). For example, the user commands may include non-standard haptic commands user 150 enters by touching touchscreen 115 of client communication device 104. In other embodiments, the user commands may include spoken natural language commands into client computing device 104.

In some embodiments, client computing device 104 may include a variety of electronic computing devices, such as, for example, a smartphone, tablet, laptop, computer, wearable device, television, virtual reality device, augmented reality device, displays, connected home device, Internet of Things (IOT) device, an enhanced general packet radio service (EGPRS) mobile phone, a media player, a navigation device, a game console, a television, a remote control, or a combination of any two or more of these data processing devices, and/or other devices.

In some embodiments, client computing device 104 may receive user input and present content to a user. In some embodiments, client computing device 104 may parse, classify, and otherwise process user input. For example, client computing device 104 may store user input including non-standard haptic commands or verbal commands for initiating IVA functionality to facilitate user's interaction with the IVR system, as will be described in detail below.

In some embodiments, client computing device 104 may include a display 115 comprising an LCD screen, a microphone 116, and a speaker 117, among other standard components. For example, display 115 maybe a touchscreen configured to allow users to operate computing device 104 by haptic or touch commands. In some embodiments, a sensor within client computing device 104 may be provided, including accompanying software, firmware and/or hardware, configured to monitor and interpret whether user input includes a "double knock" gesture input.

In some embodiments, client communication device 104 may be configured to operate in one or more communication modes. For example, client communication device 104 may operate in a data communication mode, a voice communication mode, and/or other similar communication modes.

For example, client communication device 104, operating in a voice communication mode, overall operation of client communication device 104 is substantially similar to the data communication mode, except that received signals are output to speaker 117, and signals for transmission are generated by microphone 116. In some embodiments, a voice message recording system or module may also be implemented on client communication device 104. In some embodiments, display 115 may also be utilized in voice communication mode, for example, to display the identity of a calling party, the duration of a voice call, or other voice call-related information.

Conversely, in a data communication mode, may receive a signal (e.g., a text message or media content download) and provide it as an input to be further processed to generate an output for displaying by within client computing device 104 or to an auxiliary I/O device. User 150 may also compose data items, such as e-mail messages, using a keypad and/or some other auxiliary I/O device, such as a touchpad, a rocker switch, a trackball or some other input device. The composed data items may then be transmitted over network 103.

As alluded to earlier, users may want to interact with the IVR system during a telephone communication session through a communication tool comprising IVA application 126 on IVA server 120 and adapted to accept natural language commands rather than directly interacting with the IVR system through conventional methods (e.g., responding to audio prompts, using voice commands, DTMF buttons, etc.). By virtue of using IVA application 126 to interact with the IVR system, results in a streamlined and more efficient user experience.

In some embodiments, user 150 may initiate IVA application 126 and one or more client applications (e.g., communication interface 127 illustrated in FIG. 3B) of IVA server 120 by entering one or more user commands via client computing device 104. In some embodiments, the commands entered by user 150 via client computing device 104 may be recognized by IVA application 126 of IVA server 120.

In some embodiments, a user command may include a series of haptic inputs or voice commands entered by user 150 on client computing device 104. For example, the haptic inputs entered by user 150 may include a series of knocking gestures effectuated upon touchscreen 115. In other embodiments, the user command may include a voice command spoken by user 150 (e.g., "Start Knock-Knock Assistant" or "Knock Knock"). In some embodiments, IVA server 120 may have access to sensor data of the touchscreen 115 or audio data of microphone 116 of client computing device 104. That is, IVA server 120 may receive user commands events as input and cause initiation of IVA application 126, as described in further detail below.

In some embodiments and as will be described in detail in FIG. 2, IVA server 120 may include a processor, a memory, and network communication capabilities. In some embodiments, IVA server 120 may be a hardware server. In some implementations, IVA server 120 may be provided in a virtualized environment, e.g., IVA server 120 may be a virtual machine that is executed on a hardware server that may include one or more other virtual machines. IVA server 120 may be communicatively coupled to a network 103. In some embodiments, IVA server 120 may transmit and receive information to and from one or more of client computing devices 104, IVR server 140, and/or other servers via network 103.

In some embodiments, IVA server 120 may include IVA application 126, as alluded to above. IVA application 126 may be a distributed application implemented on one or more client computing devices 104. For example, a distributed IVA application 126 may include communication interface 127 illustrated in FIG. 3B. In some embodiments, distributed IVA application 126 may be implemented using a combination of hardware and software. In some embodiments, IVA application 126 may be a server application, a server module of a client-server application, or a distributed application (e.g., with a corresponding client communication tool 127 running on one or more client computing devices 104).

In some embodiments, IVR server 140 may include a processor, a memory, and network communication capabilities. In some embodiments, IVR server 140 may be a hardware server. In some implementation, IVR server 140 may be provided in a virtualized environment, e.g., IVR server 140 may be a virtual machine that is executed on a hardware server that may include one or more other virtual machines.

IVR server 140 may be communicatively coupled to network 103. In some embodiments, IVR server 140 may transmit and receive information to and from one or more of client computing devices 104, IVA server 120 and/or other servers via network 103. In some embodiments, IVR server 140 may be configured for wired and/or wireless communications. In some embodiments, IVR server may be configured to communicate with client computing device 104 via network 103 using a data connection. In other embodiments, IVR server 140 may be configured to communicate with a VoIP provider via network 103 using a PSTN connection.

In some embodiments, IVR server 140 may comprise one or more software processes executing at IVR server 140 and configured to receive and process data transmitted from client computing device 104 and to transmit data to the applications or processes executing on client computing device 104 (e.g., IVA application 126). In some embodiments, IVR server 140 may comprise any type of automated call handling systems, e.g. IVR, VRU, ACD CTI, or CSTA, as alluded to above.

In some embodiments, software processes executing at IVR server 140 may be configured to interact with IVA server 120. For example, IVR server 140 may be configured to receive input from IVA server 120 (e.g., in response to a prompt form a call handling systems included at IVR server 140 system) and send data input from the IVR server 140 to IVA server 120 (e.g., account balance information requested by a user).

In some embodiments, IVR server 140 may communicate and interface with a framework implemented by IVA application 126 using an application program interface (API) that provides a set of predefined protocols and other tools to enable the communication. For example, the API can be used to communicate particular data from IVA application 126 used to connect to and synchronize with IVR server 140 operating a call handling system with which user 150 is interacting with during a call.

In some embodiments, communications between IVA server 120 and IVR server 140 may be implemented by using one or more communication protocols. For example, a communication protocol may comprise Extensible Messaging and Presence Protocol (XMPP). In some embodiments, one or more application formats during the communication between IVA server 120 and IVR server 140 may be implemented. For example, IVA server 120 may use Jingle media sessions, during which data such as voice is transmitted over the Realtime Transport Protocol (RTP). In some embodiments, IVA sever 120 may use Jingle DTMF format for encoding DTMF events in an XMPP stream when they cannot be encoded directly into the corresponding stream (such as RTP).

In some embodiments, client computing device 104 may be equipped with GPS location tracking and may transmit geolocation information via a wireless link and network 103. In some embodiments, IVA server 120 and/or distributed IVA application 126 may use the geolocation information to determine a geographic location associated with user 150. In some embodiments, IVA server 120 may use the signal transmitted by client computing device 104 to determine the geolocation of user 150 based on one or more of signal strength, GPS, cell tower triangulation, Wi-Fi location, or other input. In some embodiments, the geolocation associated with user 150 may be used by one or more computer program components associated with the IVA application 126 during user 150 interactions with the IVR server 140 (e.g., during a call to a business).

Figure 2:
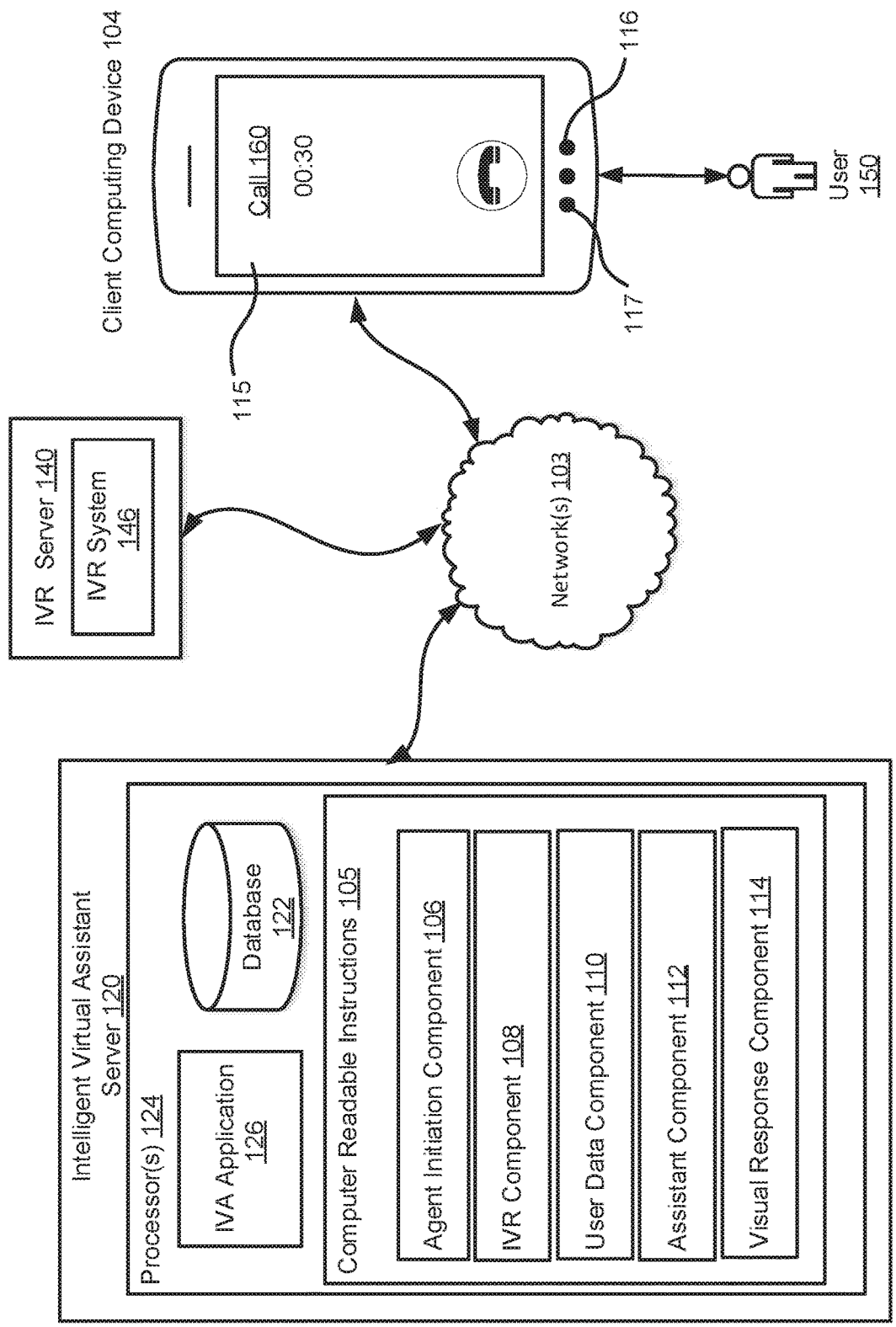
FIG. 2 illustrates an example intelligent virtual assistant (IVA) server of the example network environment of FIG. 1, according to an implementation of the disclosure.

FIG. 2 illustrates an example IVA server 120 configured in accordance with one embodiment. In some embodiments, as alluded to above, IVA server 120 may include a distributed IVA application 126 configured to provide functionality to control an IVR system 146 (e.g., an automated call handling system within IVR server 140 illustrated in FIG. 1, as alluded to above) of IVR server 140 with which user 150 is communicating during a telephone call via client computing device 104 via natural language commands.

In some embodiments, IVA application 126 may be configured to recognize user input including non-standard haptic commands and/or hand gestures entered by user 150 via display 115 of client computing device 104 or voice commands entered via microphone 116 caused to trigger responses within IVR system 146, as further described in detail below.

In some embodiments, IVA application 126 may be configured to allow user 150 to operate IVR system 146 by exchanging spoken natural language commands with one or more IVR assistants (e.g., human users or automated software agents or bots) (not illustrated) during a telephone call 160 by user 150 on client computing device 104. For example, these IVR assistants or agents may help user 150 to operate IVR system 146 by eliciting commands from user 150 intended for IVR system 146, generating responses to IVR system 146, and effectuating communication interface for displaying visual representation of IVR data generated by IVR system 146. By virtue of exchanging natural language voice commands with an assistant, user 150 can operate the IVR system without having to listen and navigate numerous menu options or respond to voice prompts, resulting in a more efficient and streamlined user experience.

In some embodiments, IVA server 120 may also include a database 122. For example, database 122 may store haptic command information, user data associated with user 150, prior user interactions or operations with IVR system 146, machine learning data, and/or other information.

In some embodiments, distributed IVA application 126 may be operable by one or more processor(s) 124 configured to execute one or more computer readable instructions 105 comprising one or more computer program components. In some embodiments, the computer program components may include one or more of an agent initiation component 106, an IVR component 108, a user data component 110, an assistant component 112, a visual response component 114, and/or other such components.

In some embodiments, as alluded to above, user 150 may access IVA server 120 via client computing device 104. In some embodiments, agent initiation component 106 may be configured to detect one or more user inputs or interactions from one of the client computing devices 104 and interpret the detected input or interaction as a command to generate a response or event in client computing device 104. For example, such response may include initiating IVA application 126. In other embodiments, the response may comprise initiating a communication interface for displaying visual representation of the IVR data, as described in further detail below. In other embodiments, user 150 may initiate IVA application 126 via one or more haptic commands, voice commands, and/or a combination of haptic and voice commands. For example, the haptic commands may include user 150 knocking, tapping, and/or scratching on client computing device 104.

In some embodiments, one or more monitoring circuits which utilize one or more sensors may be used to obtain a signal associated with the haptic commands. For example, a monitoring circuit motion sensor may utilize a motion sensor to monitor for double knocking signals made on client computing device 104. In some embodiments, an accelerometer may be used. For example, the accelerometer may be a low-g MEMS (micro-electromechanical system), a capacitive, piezoelectric, piezoresistive, or a gas-based accelerometer. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals.

In some embodiments, a pattern for generating a response or an event (e.g., initiating IVA application 126) may be defined and calibrated as a series of signals expected to be received by a sensor in client computing device 104. In some embodiments, calibrations and adjustments can be made for different time parameters (e.g. slowly entered knocks or quickly entered knocks) and magnitude qualities (e.g. loud or soft knocks), such that if the pattern of the knock is repeated, but either at a slower or faster speed than that of the expected knock pattern, adjustments can be made to compare the pattern apart from its overall duration characteristics. Additional calibrations for one or more of the directions may be made for the location of the double knocking input (e.g. whether it is on the top, back or sides of client computing device 104).

In some embodiments, a gesture may be detected on any part of touchscreen display 115. In some embodiments, the gesture detected within a particular part of display 115 may trigger a different output event than if the gesture was detected within a different part of display 115. For example, sensors may be provided at different locations inside the client computing device 104. The triggering effect may vary depending on the location of the sensors For example, a piezoelectric sensor may be integrated with different areas of the touchscreen 115.

In some embodiments, the haptic commands detected by one or more user inputs or interactions from the client computing device 104 and interpreted as a command for outputting a response or event may be selected by the IVA application 126 running on the IVA server 120. For example, the IVA application 126 may include a double knocking command used to initiate operation of IVR system 146 via natural language voice commands. In some embodiments, user 150 may modify the haptic command selection to another command available to the user. For example, user 150 may indicate that instead of double knocking, the user wants to initiate IVA application 126 by scratching client computing device 104. In some embodiments, user 150 may create a new haptic or voice command by recording the user input associated with the command.

In some embodiments, agent initiating component 106 may be configured to capture audio signal produced from the haptic input (such as knocking, tapping, or scratching) or voice input (such as a voice command spoken by a user) by the device microphone. For example, user 150 may speak "Start Knock-Knock" into microphone 116 of computing device 104 resulting in an audio signal. In some embodiments, the captured audio signal may be obtained by agent initiating component 106 to determine whether the audio signal corresponds to the audio signal used to initiate IVA application 126. For example, the audio signal may be obtained from microphone 116 of client computing device 104. In some embodiments, agent initiating component 106 may be configured to manipulate the audio signal obtained by transmitting the audio signal to the IVA server 120. In some embodiments, agent initiating component 106 may be configured to process audio signal. For example, agent initiating component 106 may be configured to perform at least one of a noise removal, windowing, and a spectrum analysis during processing of the audio signal. In some embodiments, agent initiating component 106 may be configured to determine if the audio signal received from the microphone of client computing device 104 is a valid haptic input or a voice command by matching the processed audio signal to a valid audio signal. In some embodiments, the valid audio signal may be obtained from database 122.

In some embodiments, upon determining by agent initiating component 106 that the agent initiating command (i.e., the haptic or voice command) is valid, IVR component 108 may be configured to transmit voice data between the IVA application 126 and IVR system 146. As alluded to above, IVR component 108 may use XMPP protocols (e.g., Jingle) to exchange voice data over the Realtime Transport Protocol (RTP).

In some embodiments, audio data, such as verbal prompts delivered using a synthesized or recorded voice, may be received by IVR component 108 from the IVR system 146 via client computing device 104. For example, IVR component 108 may receive audio data from the IVR system 146 via a speaker 117 of client computing device 104.

In some embodiments, verbal prompts or other data received by IVR component 108 may be processed to determine the content of the prompt. For example, IVR component 108 may analyze the audio data received by from the IVR system 146 using waveform analysis and/or natural language processing methods (e.g., automatic speech recognition, comparison of received audio to predetermined samples, etc.). In some embodiments, IVR component 108 may determine if the audio data received includes a message to the user. For example, the message may include the information the user requested, an advisory message (e.g., "please continue holding"), and/or a prompt for user input (e.g., "please enter your account number"). In some embodiments, IVR component 108 may determine whether the information included in the message includes the information that the user requested, as discussed further below.

In some embodiments, IVR component 108 may be configured to obtain and process user input received by client computing device 104. For example, IVR component 108 may receive audio input entered by user 150 via a microphone 116 of client computing device 104. In some embodiments, IVR component 108 may process user input comprising an audio file by performing one or more operations including, for example, voice recognition, conversion of voice messages into textual format, and/or other such operations.

In some embodiments, IVR component 108 may convert the user input comprising an audio file into a text file by converting the audio file into the text file according to a voice recognition process that may be implemented by IVA application 126. For example, after obtaining the user audio file, IVR component 108 may convert the audio file to the text file according to the voice recognition process algorithm implemented by IVA application 126. In some embodiments, chat IVR component 108 may perform voice recognition by means of a pattern matching method and/or other similar method. For example, when using a pattern matching method to perform voice recognition, a training stage and a recognition stage may be used.

In some embodiments, IVR component 108 may transmit the user provided input or response (i.e., audio data) to IVR system 146 as computer signals (e.g., raw data). In some embodiments, IVR component 108 may generate audio data using the user input, such as by producing DTMF tones or a recorded or synthesized voice representative of the portion(s) of the user input. The audio data may then be provided to IVR system 146, which may receive the audio data in the same manner that DTMF tone or spoken responses would be received from a human user.

In some embodiments, user data component 110 may be configured to obtain information associated with user and user operations. For example, user data component 110 may obtain user input transmitted by user 150 to IVR system 146 prior to invoking IVR application 126.

In some embodiments, user data component 110 may be configured to obtain user information from IVR system 146. For example, user information may include information commonly requested when interacting with an IVR system, such as a user's name, date of birth, social security number, one or more account numbers, one or more passwords, and so forth. In some embodiments, the information associated with user and user operations obtained from IVR system 146 may include historic user information, i.e., information related to prior interactions of user 150, such as prompts selected by the user. For example, prior user operations may include information related to information user 150 sought from the IVR system 146 and/or the underlying merchant or business. In other embodiments, user data component 110 may obtain historic information associated with other users that have previously utilized the IVR system 146.

In some embodiments, user data component 110 may obtain information associated with the IVR system 146. For example, the information may include at least one of a representation of the IVR prompt, a known sequence of IVR prompts, and a predetermined response.

In some embodiments, at least a portion of the user information corresponding to the request for information may be determined by user data component 110, and the corresponding portion(s) of the user information may be transmitted back to IVR system 146 by IVR component 108.

In some embodiments, user data component 110 may be configured to determine one or more user intended actions user 150 was attempting to achieve when interacting with the IVR system. For example, user data component 110 may determine that user 150 is calling a credit card provider. In some embodiments, user data component 110 may obtain information associated with user responses to voice prompts indicating that user 150 is looking to determine account balance information. In some embodiments, user information may include user profile data, user demographic information, user status, and so on. In some embodiments, user data component 110 may be configured to obtain information associated with user profile maintained by IVR system 146 or the account associated the underlying merchant. By virtue of obtaining user information and determining user intended actions (e.g., user intends to obtain account balance information) by user data component 110, allows IVA application 126 to generate a response to IVR system 146 that is most likely to result in a satisfactory user experience as described further below. For example, IVR component 108 may transmit user account information to IVR system 146 eliminating the need for user's 150 input.

In some embodiments, the response is determined based at least in part on previously stored information associated with the call center, the previously stored information comprising at least one of a representation of the IVR prompt, a known sequence of IVR prompts, and a predetermined response.

In some embodiments, user data component 110, may be configured to use machine learning, i.e., a machine learning model that utilizes machine learning to determine user intended actions. For example, in a training stage the expert server (or other component) can be trained using training data (e.g., historic user training data) of actions in an IVR system, and then at an inference stage can determine suggested items to intended actions or other data it receives. For example, the machine learning model can be trained using synthetic data, e.g., data that is automatically generated by a computer, with no use of user information. In some embodiments, the machine learning model can be trained based on sample data, e.g., sample audio response data, for which permissions to utilize user data for training have been obtained expressly from users providing the audio response. For example, sample data may include interactions between other users and IVR system 146. Based on the sample data, the model can predict which actions and/or results user 150 would want to achieve, which may then be provided as intended user actions.

In some embodiments, user data component 110 may be configured to use one or more of a deep learning model, a logistic regression model, a Long Short Term Memory (LSTM) network, supervised or unsupervised model, etc. In some embodiments, user data component 110 may utilize a trained machine learning classification model. For example, the machine learning may include, decision trees and forests, hidden Markov models, statistical models, cache language model, and/or other models. In some embodiments, the machine learning may be unsupervised, semi-supervised, and/or incorporate deep learning techniques.

In some embodiments, IVA application 126 may be configured to allow user 150 to operate IVR system 146 by exchanging spoken natural language commands with one or more IVR assistants (e.g., human users or automated software agents or bots) (not illustrated) during a telephone call 160 by user 150 on client computing device 104. For example, these IVR assistants or agents may assist user 150 to operate IVR system 146 by eliciting commands from user 150 intended for IVR system 146, generating responses to IVR system 146, and effectuating communication interface for displaying visual representation of IVR data generated by IVR system 146. By virtue of exchanging natural language voice commands with an assistant, user 150 can operate the IVR system without having to listen and navigate numerous menu options.

In some embodiments, assistant component 112 may be configured to use user input received by client computing device 104, obtained and processed by IVR component 108, as alluded to above. For example, the user input may include a voice command from user 150 "obtain balance information." In some embodiments, based on user 150 voice command, assistant component 112 may determine an item within a voice menu of within IVR system 146 which is best suited for the voice command of user 150. That is, instead of user 150 listening to a list of menu items (e.g., "press 1 for hours of operation," "press 2 for address," "press 3 for account information," and "press 4 for technical support"), user 150 may be directly routed to the correct menu item (e.g., account information).

In some embodiments, assistant component 112 may provide the menu item determination to IVR component 108 so it can transmit user response to IVR system 146. For example, IVR component 108 may transmit computer signals or an audio data (e.g., DTMF tones) corresponding to "account information" menu item selection.

In some embodiments, assistant component 112 may prevent the audio prompts generated by IVR system 146 that are not relevant to user's 150 selection from being heard by user 150.

In some embodiments, assistant component 112 may be configured to use IVR data obtained by IVR component 108 and determine response data without receiving input from user 150. For example, assistant component 112 may utilize predictions determined by user component 110 as to what is the most likely menu item user 150 is trying to reach.

Figure 3B:
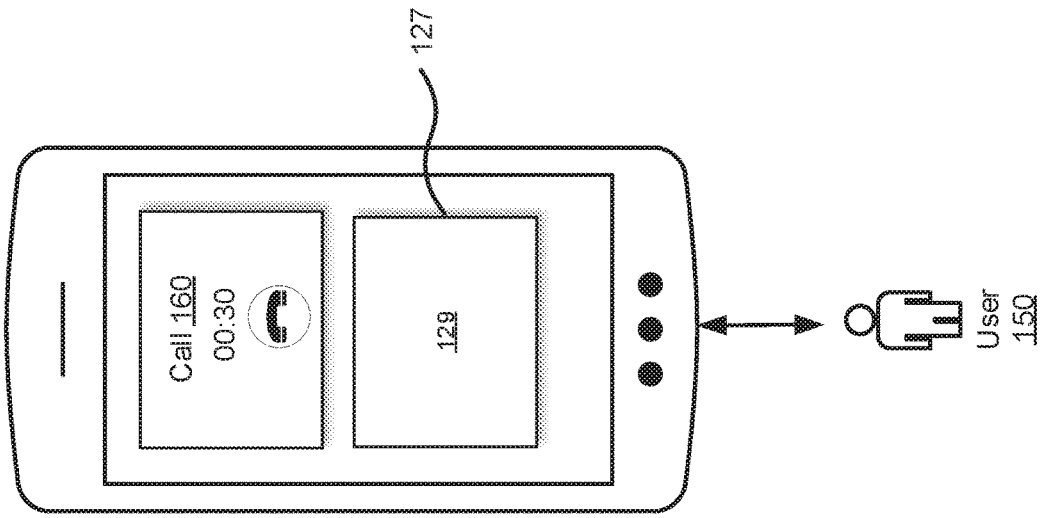
FIGS. 3A-3B illustrate an example process for initiating a communication interface configured to facilitate user's interaction with an Interactive Voice Response system (IVR), according to an implementation of the disclosure.
Figure 3A:
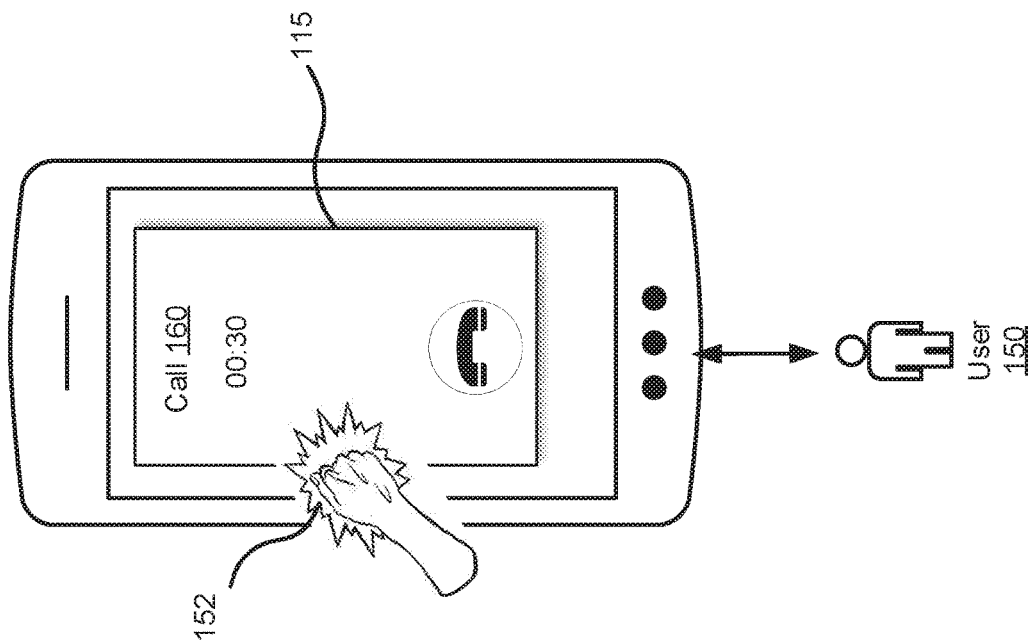

In some embodiments, visual response component 112 may be configured to initiate communication interface 127 on client computing device 104. For example, as illustrated in FIG. 3A, user 150 may input a command 152 comprising a double knock onto a touchscreen 115 of client computing device 104 after user has initiated a call to an IVR system 160 on client computing device 104. Upon receiving a determination from agent initiating component 106 that command 152 is a valid command, visual response component 112 may be configured to initiate communication interface 127 on client computing device 104, as illustrated in FIG. 3B.

In some embodiments, communication interface 127 may comprise a GUI 129 and may be configured to generate visual representation of voice data transmitted by IVR system 146. In some embodiments, the visual representation may include data such as text data and media data (e.g., image data or video data).

Figure 4A:
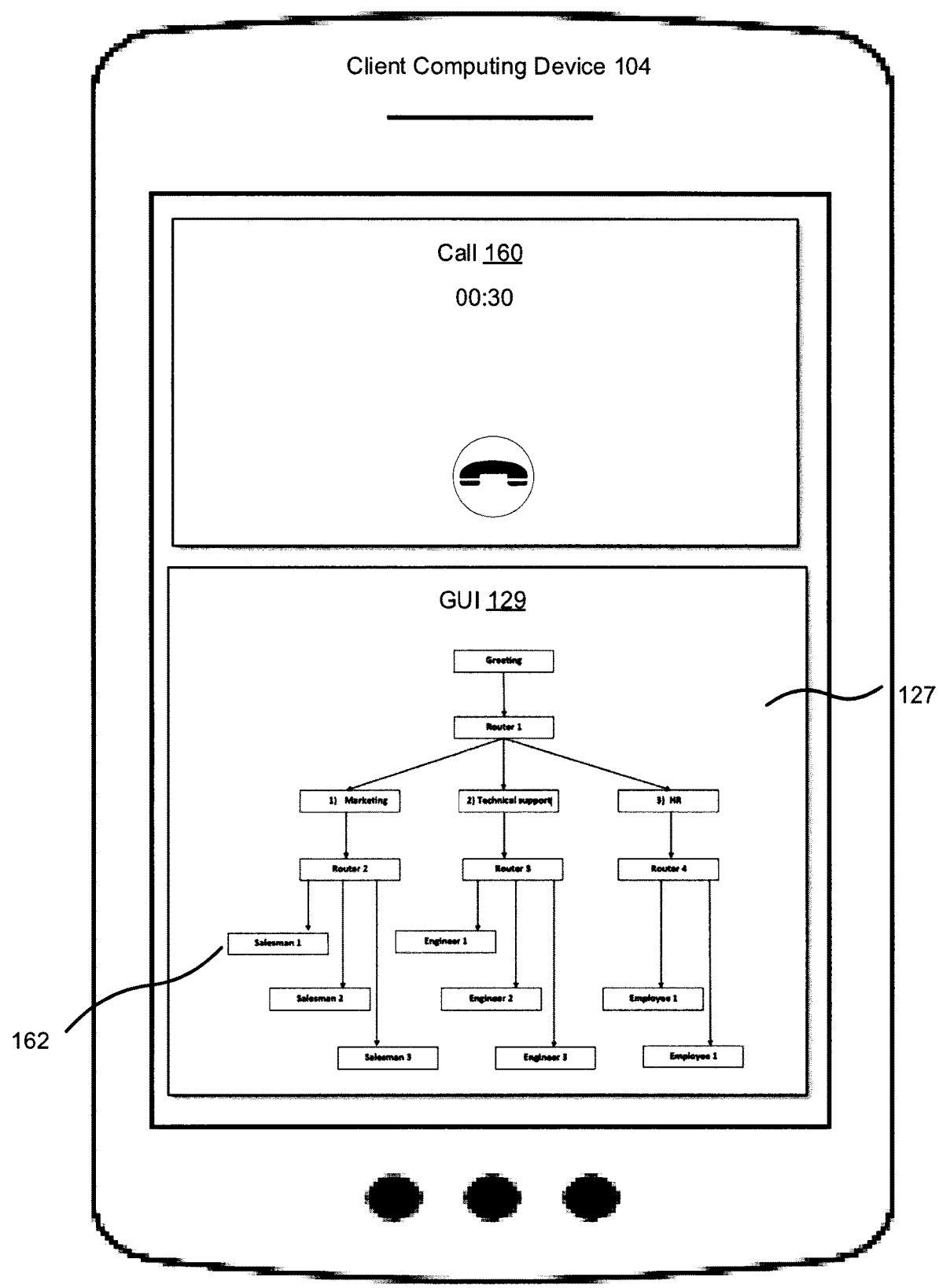
FIGS. 4A-4B illustrate an example process for displaying visual representation data in the communication interface of FIGS. 3A-3B, according to an implementation of the disclosure.

In some embodiments, visual response component 112 may generate visual representation data corresponding to an interactive voice response menu associated with IVR system 146. For example, as illustrated in FIG. 4A, GUI 129 associated with communication interface 127 may display a menu 162 comprising all of the menu elements available.

In some embodiments, visual response component 112 may effectuate visual representation data at the same time the voice menu is audibly presented to user 150.

Figure 4B:
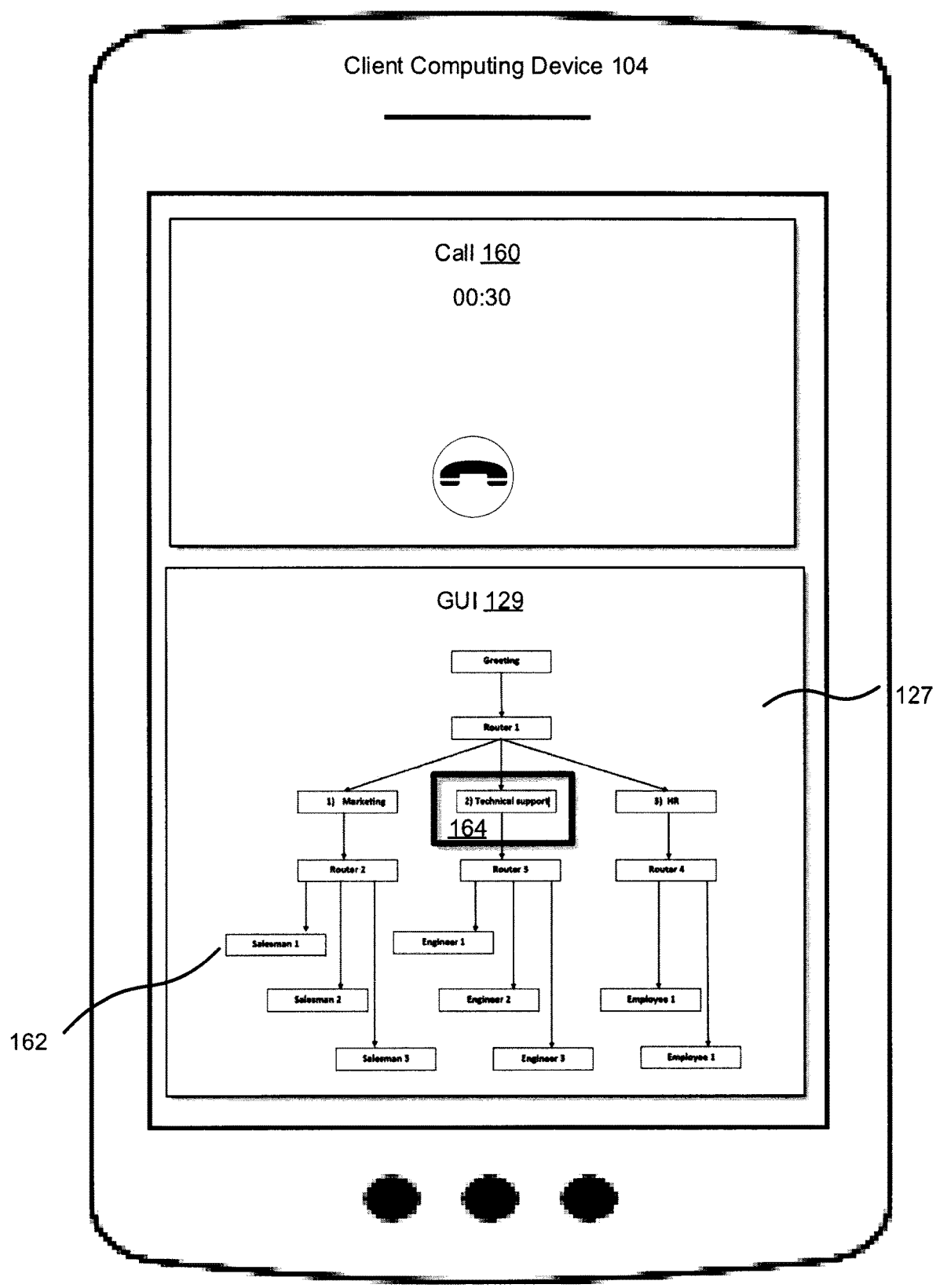

In some embodiments, the visual representation data may include other types of information generated and presented by visual response component 112 at the same time the same or similar information is audibly presented to the caller. For example, visual response component 112 may generate visual cues indicating a respective menu item which is being audibly presented to user 150. For example as illustrated in FIG. 4B, a menu item 164 within menu 162 may be highlighted at the same time as it is being audibly presented to user 150.

In some embodiments, the visual representation data may include user input (e.g., user commands provided by user 150 to IVA application 126). For example, these user commands may be converted to text by a speech-to-text function or other audio processing function of IVA application 120. In some embodiments, visual response component 112 may display to user 150 the text of each user command via GUI 129 associated with communication interface 127.

In some embodiments, visual response component 112 may effectuate a visual presentation of menu options or information may replace an audible presentation of menu options or information as part of the interactive voice response scripts.

Figure 5:
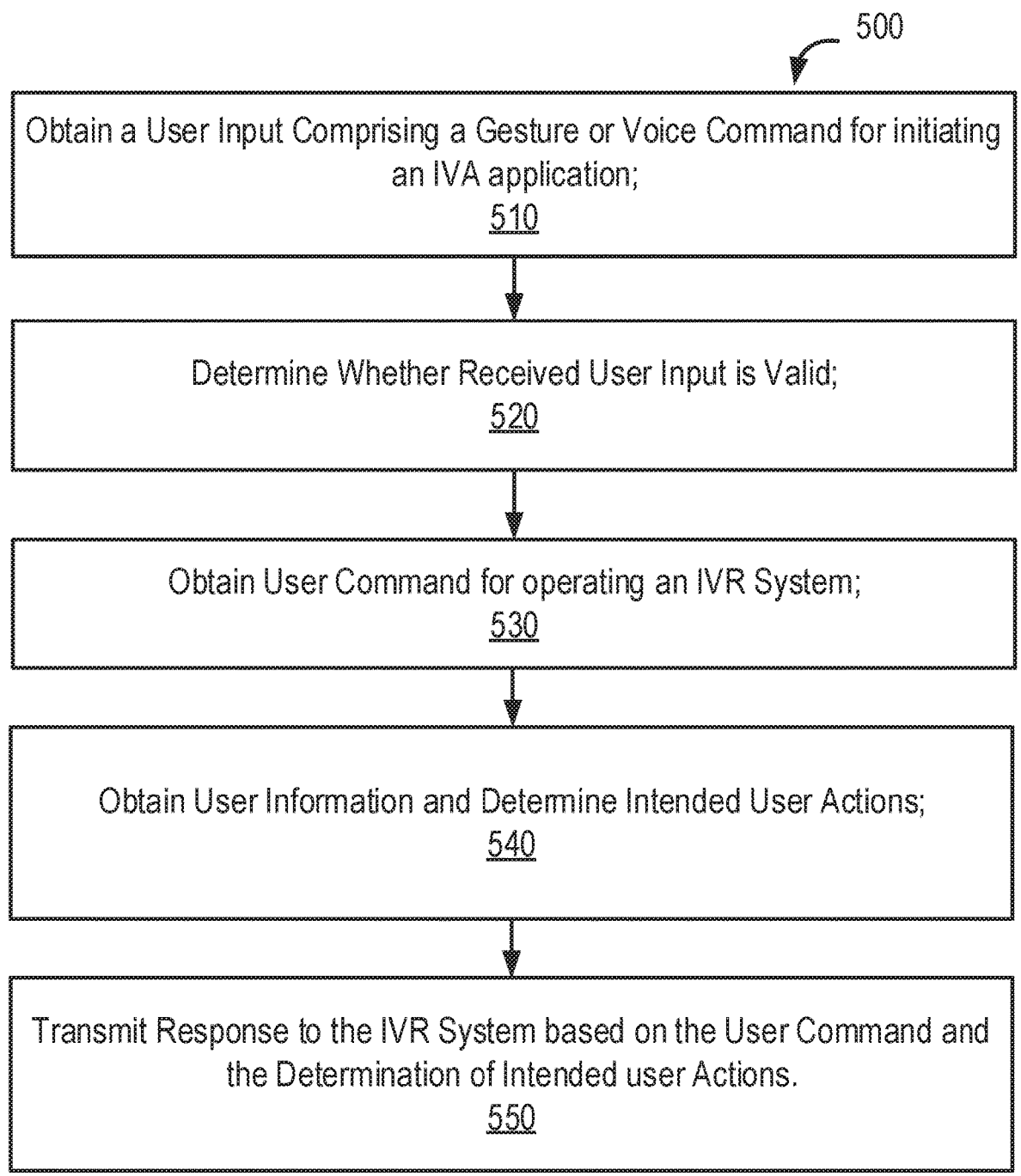
FIG. 5 illustrates an example process for providing a user command to the IVR system, according to an implementation of the disclosure.

FIG. 5 illustrates a flow diagram describing a method for initiating an intelligent virtual assistant in order to facilitate a user's interaction with the automated call handling system, in accordance with one embodiment. In some embodiments, method 500 can be implemented, for example, on a server system, e.g., IVA server 120, as illustrated in FIGS. 1-2. At operation 510, agent initiation component 106 obtains user input command (e.g., a voice command or a double knock) for initiating an IVA application (e.g., IVA application 126 on IVA server 120). At operation 520, agent initiation component 106 determines whether received user input for initiating the IVA application is valid.

At operation 530, upon determining that the user input for initiating the IVA application is valid, IVR component 108 obtains a user command for operating an IVR system (e.g., IVR system 146 on IVR server 140). For example, as alluded to earlier, IVR component 108 may process an audio signal obtained from a microphone of client computing device and convert it to a text file.

Figure 6:
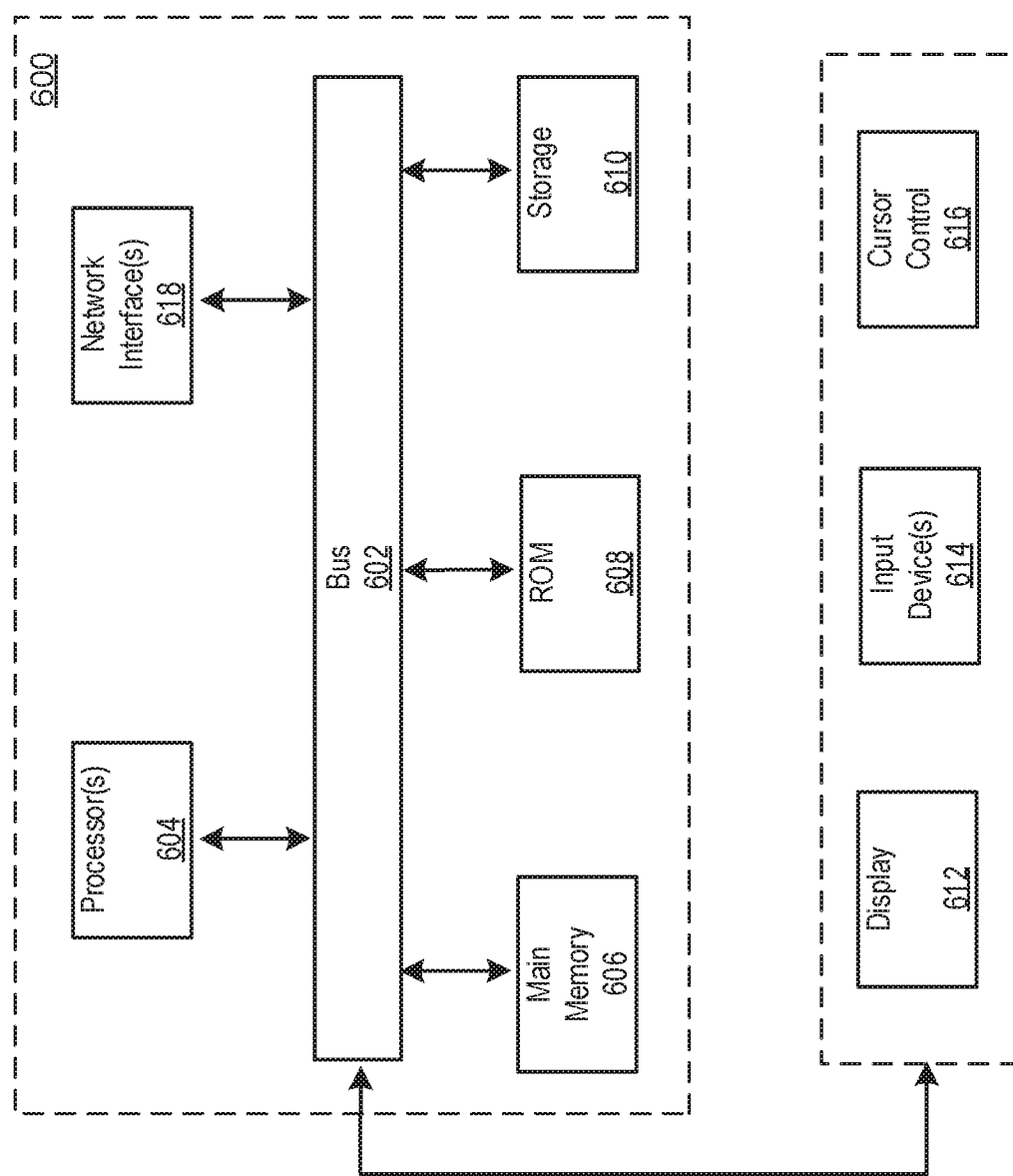
FIG. 6 illustrates an example computing system that may be used in implementing various features of embodiments of the disclosed technology.

At operation 540, user data component 110 obtains information associated with user and user operations prior to initiating the IVA application to determine the intended user actions. At operation 550, upon receiving a user command from IVR component 108 at operation 530 and a determination of intended user actions by user data component 110 at operation 540, assistant component 112 may be configured to transmit a response to the IVR system based on the user command the determination of intended user actions.

Where circuits are implemented in whole or in part using software, in one embodiment, these software elements can be implemented to operate with a computing or processing system capable of carrying out the functionality described with respect thereto. One such example computing system is shown in FIG. 6. Various embodiments are described in terms of this example-computing system 600. After reading this description, it will become apparent to a person skilled in the relevant art how to implement the technology using other computing systems or architectures.

Referring now to FIG. 6 depicting a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 605, such as a random access memory (RAM), cache and/or other dynamic storage devices, coupled to bus 602 for storing information and instructions to be executed by processor 604. Main memory 605 may also be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 510, such as a magnetic disk, optical disk, or USB thumb drive (Flash drive), etc., is provided and coupled to bus 602 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 605. Such instructions may be read into main memory 605 from another storage medium, such as storage device 510. Execution of the sequences of instructions contained in main memory 605 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 605. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 602. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for providing a visual representation of an interactive voice response (IVR) system, the method comprising:
   initiating a conversation interface during a call between a mobile device operated by a user and an automated call handling system, wherein the automated call handling system is associated with an IVR system, the IVR system comprising a plurality of IVR prompts, and wherein the conversation interface configured to receive user input comprising natural language user commands for operating the automated call handling system;

displaying the conversation interface adjacent to a graphical user interface (GUI) associated with the call to the automated call handling system on a display of the mobile device;

obtaining a visual representation of the IVR prompts displayed in the communication interface;

obtaining a first user input comprising a first natural language command;

determining a first user action based on the first natural language command, wherein the first user action specifies a first user request;

obtaining historic user information associated with the automated call handling system, the historic information comprising a plurality of IVR prompts previously selected by the user using natural language commands;

determining a first IVR prompt associated with the first user request based on the plurality of IVR prompts previously selected by the user using the natural language commands specified by the historic information; and displaying a visual indication associated with the determined first IVR prompt within the visual representation of the IVR prompts displayed within the conversation interface;

wherein natural language commands comprise human conversational speech.

2. The method of claim 1, wherein the plurality of IVR prompts comprises at least one of a known sequence of IVR prompts, and a predetermined IVR response.

3. The method of claim 1, further comprising obtaining a first assistant response generated by an intelligent voice assistant (IVA) system in response to the first user input and displaying a visual representation of the first assistant response within the conversation interface, wherein the first assistant response is based on the first natural language command associated with the first user input.

4. The method of claim 3, further comprising determining a first user action based on the first natural language command of the user, wherein the first user action specifies a first user request.

5. The method of claim 4, wherein determining the first user action comprises identifying an IVR prompt associated with the first user request using a machine learning algorithm on the first natural language command, the known sequence of IVR prompts, the predetermined IVR response the prompt information, and the historic user information.

6. The method of claim 5, further comprising:
transmitting the identified IVR prompt to the automated call handling system based on the determined first user action;
obtaining a first audio response from the automated call handling system in response to the transmitted user action; and
displaying a visual representation of the first audio response in the conversation interface upon determining that the first audio response includes information associated with the first user request specified by the first user action.

7. The method of claim 6, further comprising:
obtaining a second user input comprising a second natural language command generated by the user in response to the first audio response;
determining a second IVR prompt associated with a second user action determined based on the second natural language command, wherein the second user action specifies a second user request; and
displaying a visual indication associated with the determined second IVR prompt within the visual representation of the IVR prompts.

8. The method of claim 1, wherein the conversation interface is initiated using a command comprising a haptic input effectuated on the mobile device.

9. The method of claim 8, wherein the haptic input of the initiating command for initiating the IVA system comprises a tap pattern.

10. A system for providing a visual representation of an interactive voice response (IVR) system, the system comprising:
one or more physical processors configured by machine-readable instructions to:
initiate a conversation interface during a call between a mobile device operated by a user and an automated call handling system, wherein the automated call handling system is associated with an interactive voice response (IVR) system, the IVR system comprising a plurality of IVR prompts, and wherein the conversation interface configured to receive user input comprising natural language user commands for operating the automated call handling system;

display the conversation interface adjacent to a graphical user interface (GUI) associated with the call to the automated call handling system on a display of the mobile device;

obtain a visual representation of the IVR prompts displayed in the communication interface;

obtain a first user input comprising a first natural language command;

determine a first user action based on the first natural language command, wherein the first user action specifies a first user request;

obtain historic user information associated with the automated call handling system, the historic information comprising a plurality of IVR prompts previously selected by the user using natural language commands;

determine a first IVR prompt associated with the first user request based on the plurality of IVR prompts previously selected by the user using the natural language commands specified by the historic information; and display a visual indication associated with the determined first IVR prompt within the visual representation of the IVR prompts displayed within the conversation interface;

wherein natural language commands comprise human conversational speech.

11. The system of claim 10, wherein the plurality of IVR prompts comprises at least one of a known sequence of IVR prompts, and a predetermined IVR response.

12. The system of claim 10, wherein the one or more physical computer processors is further configured by computer readable instructions to obtain a first assistant response generated by an intelligent voice assistant (IVA) system in response to the first user input and displaying a visual representation of the first assistant response within the conversation interface, wherein the first assistant response is based on the first natural language command associated with the first user input.

13. The system of claim 12, wherein the one or more physical computer processors is further configured by computer readable instructions to:

determine a first user action based on the first natural language command of the user;

wherein the first user action specifies a first user request.

14. The system of claim 13, wherein determining the first user action comprises identifying an IVR prompt associated with the first user request using a machine learning algorithm on the first natural language command, the known sequence of IVR prompts, the predetermined IVR response the prompt information, and the historic user information.

15. The system of claim 14, wherein the one or more physical computer processors is further configured by computer readable instructions to:

transmit the identified IVR prompt to the automated call handling system based on the determined first user action;

obtain a first audio response from the automated call handling system in response to the transmitted user action; and display a visual representation of the first audio response in the conversation interface upon determining that the first audio response includes information associated with the first user request specified by the first user action.

16. The system of claim 15, wherein the one or more physical computer processors is further configured by computer readable instructions to:

obtain a second user input comprising a second natural language command generated by the user in response to the first audio response;

determine a second IVR prompt associated with a second user action determined based on the second natural language command, wherein the second user action specifies a second user request; and display a visual indication associated with the determined second IVR prompt within the visual representation of the IVR prompts.

17. The system of claim 10, wherein the conversation interface is initiated using a command comprising a haptic input effectuated on the mobile device, the haptic input comprising a tap pattern.

* * * * *